Nov. 25, 1930.    N. FLORINE    1,783,011
HELICOPTER
Filed Nov. 26, 1927    2 Sheets-Sheet 1
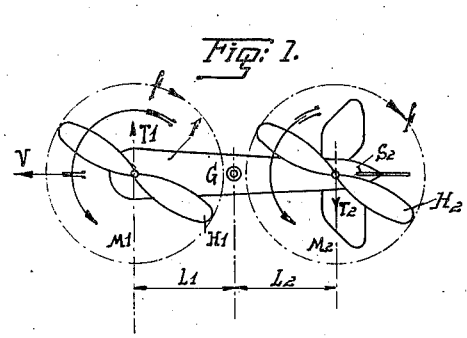
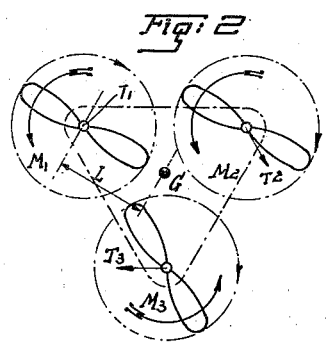
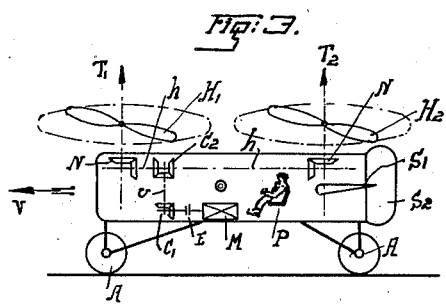
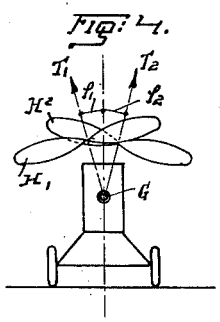
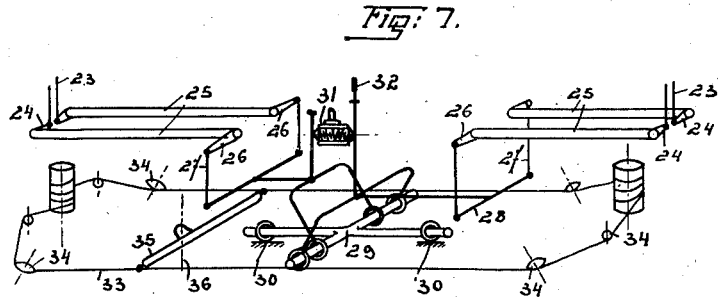
Inventor:
Nicolas Florine
by
Victor D Borst
Atty.

Nov. 25, 1930.  N. FLORINE  1,783,011
HELICOPTER
Filed Nov. 26, 1927   2 Sheets-Sheet 2
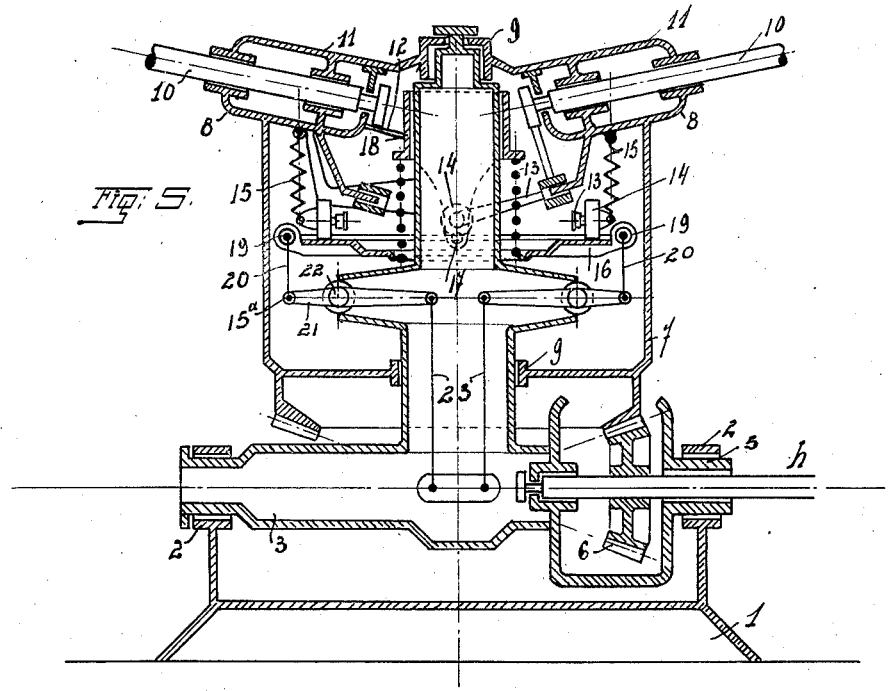
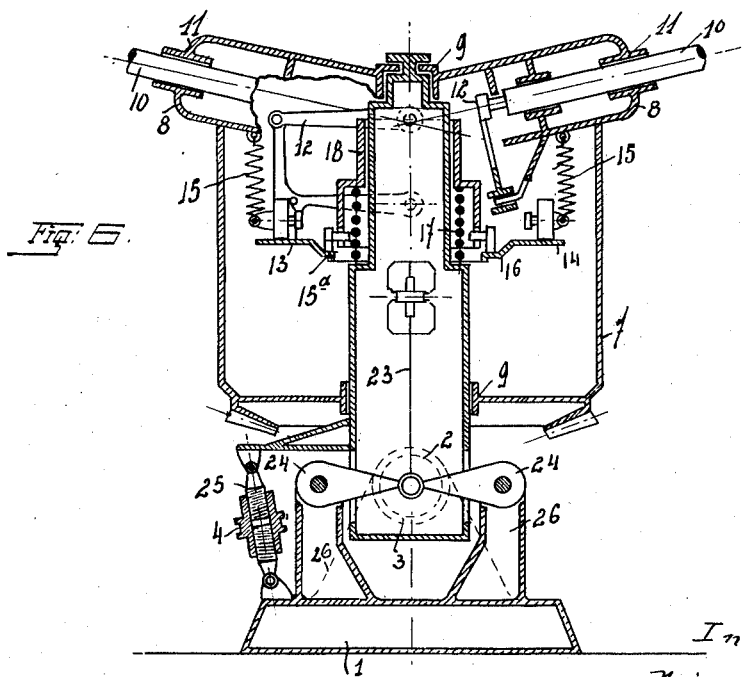

Patented Nov. 25, 1930

1,783,011

UNITED STATES PATENT OFFICE

NICOLAS FLORINE, OF BRUSSELS, BELGIUM, ASSIGNOR OF TEN PER CENT TO SOCIETE NATIONALE POUR L'ETUDE DES TRANSPORTS AERIENS, SOCIETE ANONYME, OF BRUSSELS, BELGIUM

HELICOPTER

Application filed November 26, 1927, Serial No. 235,789, and in Belgium December 3, 1926.

To counterbalance the moment of the reaction of the air upon the machine as a whole, most helicopters constructed to date are fitted with an even number of propellers, of which half turn to the right and half to the left. This arrangement cancels at the same time the gyroscopic action and a similar aerodynamic action which stabilize a single propeller.

This invention relates to a helicopter designed to counterbalance the moment of reaction without resorting to propellers turning in different directions and to profit in consequence by the stabilizing action of several propellers turning in the same direction.

This helicopter comprises two or more propellers all turning in the same direction. The axes of these propellers do not meet and are not parallel the sum of the tractions of all the propellers amounts to a force equal and opposite to the weight of the helicopter and to a couple equal and opposite to the sum of all the couples of reaction of all the propellers. These conditions may be attained in an infinite number of ways. This invention relates specially to their realization in the case of two or more almost identical propellers arranged symmetrically about the centre of gravity.

Referring to the annexed drawings:

Fig. 1 is a plan, Fig. 2 is a plan showing three propellers, Fig. 3 a side view and Fig. 4 a front view of a helicopter constructed according to my invention.

Figs. 5, 6 and 7 show details on an enlarged scale.

Referring more particularly to Figs. 1 to 3, the helicopter shown is provided with two propellers $H_1$ and $H_2$. They turn in the direction indicated by the arrows and communicate to the fuselage F the tractions $T_1$ and $T_2$ and the couples $M_1$ and $M_2$. The axes of the propellers are situated in vertical planes perpendicular to the symmetrical plane of the fuselage and are inclined to the vertical at angles $\varphi_1$ and $\varphi_2$.

In the case of symmetry we have:
$$T_1 = T_2 = T, M_1 = M_2 = M,$$
$$\varphi_1 = \varphi_2 = \varphi, L_1 = L_2 = L$$

and the equations for equilibrium give $2T \cos \varphi$ equal to the weight G and $$2TL \sin \varphi = 2M \cos \varphi$$

from which the angle of inclination of the axes is deduced $$\tan \varphi = \frac{M}{TL}$$

In the same manner the angle $\varphi$ may be found in the case of the three propellers shown in Fig. 2 and for any other number of propellers.

The following description relates to one construction of the helicopter based on the principle expounded above and shown in Figs. 1, 3 and 4.

In the fuselage F is situated the motor M, the revolution of which is transmitted by means of the clutch E to the bevel gears $C_1$, to the vertical shaft $v$, the bevel gears $C_2$ and the two horizontal shafts $h$, which latter transmit the revolutions at the points N to the propeler carrying bells.

Further the fuselage is fitted with landing wheels A, movable auxiliary planes, $s_1$ horizontal and $s_2$ vertical, helping to maintain stability during advancement, and all the necessary accessories such as the working levers, the installation of the motor, the pilot's seat P, etc.

During the movement of advance in the direction V the propellers turn in the direction $f$ (Figs. 1 and 5), the left hand blade has a greater velocity than the right hand one, and a propeller with fixed pitch would be subjected to an upsetting couple with a tendency to raise the left side and depress the right. Further to overcome the resistance of inertia, the helicopter would have to be inclined forwards to obtain a horizontal component of traction in the direction of the displacement. To counterbalance the upsetting couple and to produce working couples in the required direction, the helicopter is provided with a special device for altering the angle of incidence of the blades, either by increasing or diminishing same by the same amount for all the blades, or by increasing the angle of incidence when the blade is on the right hand and diminishing it when it is on the left hand or inversely.

In consequence the following manoeuvres can be carried out:

(1) A couple for lateral inclination, by giving a different angle to the left hand blades than to the right.

(2) A couple for longitudinal inclination by giving to all the blades of the front propeller an angle greater or smaller than the angle of the blades of the rear propeller.

(3) Ascending or descending by altering to the same amount the angle of incidence of all the blades at a constant number of revolutions.

Further by turning the propeller carrying bells in the reverse direction round the axis of the shafts $h$, the angle may be altered and a revolving motion round a vertical axis may be started or stopped. The devices for carrying out the above manoeuvres are situated at the points N (Fig. 3) and are shown in detail in the Figs. 5 and 6.

The frame 1 rigidly attached to the fuselage carries two pedestals 2 on which pivots a gear case 3 shaped like an inverted T and which is further connected to the frame by means of a tightener 4 with right and left handed screws, which allows the inclination of the gear case (the angle $\varphi$) to be changed. The gear case carries the bearings 5 in which the shaft $h$ revolves (see also Fig. 3) carrying the bevel pinion 6. The pinion 6 gears with a crown wheel forming part of the bell 7, which latter supports four arms 8 and turns round the gear case 3 by means of the thrust bearing 9.

The arms 8 carry the propeller blades 10 by means of the bearings and thrust blocks 11. At the ends of the blades 10 are rigidly fixed the cranks 12 which allow the angle of incidence of the blades to be altered. The cranks 12 form part of the articulated parallelograms to which the rollers 14 are attached by means of the finger 13. The rollers 14 are forced downwards by means of the springs 15 against the roller path 16 and by the aerodynamic force owing to a suitable choice of the position of the axis on which the blade pivots in regard to the centre of pressure on the blades. The roller path 16 is connected at 17 by a joint to two lugs on the sleeve 18, which can slide without turning on the gear case 3. By this means the roller path can rise and fall or be inclined, to alter the angles of incidence of the blades.

The tendency of the roller path to descend owing to the action of the springs 15, is overcome by the spring $15^a$ compressed between the gear case 3 and the sleeve 18.

To enable the position of the roller path to be altered, it carries two ears 19 which follow the movement of the ends of the levers 21 pivoting round the fixed points 22 on the gear case 3, by means of the articulated rods 20. At the other ends of the levers 21 are jointed the rods 23, which act in turn on the cranks 24, fixed on the shafts 25 supported by the cranks 26 forming part of the frame 1.

Fig. 7 shows in perspective and diagrammatically, how the working manipulations are transmitted from the seat of the pilot to the shafts 25 (Fig. 5, 6 and 7). The further ends of the shafts 25 carry the cranks 26 influencing by means of the rods 27 the bent pieces 28 which pivot on one pair of arms of the cross 29, of which the other pair of arms pivot in the pedestals 30 fixed to the fuselage. The two parts 28 are connected by means of a right and left handed screw tightener 31, which enables the angles of incidence of all the blades of the two propellers to be varied to the same amount and in the same direction. The shaft of one of the parts 28 carries the handle 32 actuated by the hand of the pilot. By pushing it forwards the angle of incidence of the rear propeller is diminished and that of the fore propeller is increased.

By inclining it sideways a couple is formed which inclines the helicopter in the direction of the inclination of the hand lever.

The rotation of the sleeves of the tighteners 4 which alter the angle, is obtained by means of a rope wound round the sleeves 4, passing round the pulleys 34 and fastened to the swingle bar 35. This swingle bar, as in the case of an aeroplane, pivots round a vertical axis 36 and is actuated by the feet of the pilot.

What I claim is:

1. In a helicopter, in combination with a fuselage, two propellers, bells carrying the said propellers, a motor, two shafts in alignment with each other a driving gear arranged between the said motor and the said shafts, means for rotating the propeller bells by aid of the said shafts, a roller path arranged in the propeller bells, means whereby the position of the said roller path may be altered and rollers connected to the propeller blades whereby the angle of incidence of the propeller blades may be varied by the displacement of the roller path.

2. In a helicopter, in combination with a fuselage, two propellers, bells carrying the said propellers, a motor, two shafts in alignment with each other, a driving gear arranged between the said motor and the said shafts, means for rotating the propeller bells by aid of the said shafts, a roller path arranged in each propeller bell, rollers connected to the propeller blades, the said rollers cooperating with the roller path and means whereby the position of the roller path in each bell may be actuated from the seat of the pilot.

3. In a helicopter in combination with a fuselage, two propellers, bells carrying the said propellers, a motor, two shafts in alignment with each other, a driving gear arranged between the motor and the said shafts, means for rotating the propeller bells by aid of the said shafts, a roller path arranged in each propeller bell, rollers connected to the propeller blades, the said rollers cooperating with the roller path, a seat for the pilot, a single hand lever arranged near the said seat, a tightener connected to the said hand lever and a swingle bar whereby the said tightener is operated to alter the couple round a vertical axis.

4. In a helicopter, a plurality of propellers, means for causing all of the propellers to revolve in the same direction, and means for causing the helicopter to be inclined forwardly and for suppressing the lateral upsetting couple to secure horizontal flight.

5. In a helicopter, a plurality of propellers, means for causing all of the propellers to revolve in the same direction, and means including varying the angle of incidence of the propeller blades for causing the helicopter to be inclined forwardly and for suppressing the lateral upsetting couple to secure horizontal flight.

6. In a helicopter, a plurality of propeller shafts, adapted to rotate in the same direction, propellers mounted on said shafts and adapted to be rotated thereby, the axis of the propeller shafts being inclined in different vertical planes for balancing the torque movements of the propellers and eliminating rotation of the helicopter frame.

7. In a helicopter, a plurality of propeller shafts, propellers mounted on said shafts and adapted to be rotated thereby, the said propeller shafts being inclined with respect to the vertical and to each other and the angles formed by the propeller shafts being such that the sum of the torque movements of the propellers and of the movements about the center of gravity of their traction is equal to zero, and means for rotating the propeller shafts so that all the propellers revolve in the same direction.

In testimony whereof I have affixed my signature.

NICOLAS FLORINE.